(12) United States Patent
Baars

(10) Patent No.: US 9,830,345 B1
(45) Date of Patent: Nov. 28, 2017

(54) CONTENT-ADDRESSABLE DATA STORAGE

(71) Applicant: SEMMLE LIMITED, Oxford (GB)

(72) Inventor: Arthur Baars, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/275,681

(22) Filed: Sep. 26, 2016

(51) Int. Cl.
*G06F 17/30* (2006.01)
*G06F 11/14* (2006.01)

(52) U.S. Cl.
CPC ...... *G06F 17/3033* (2013.01); *G06F 11/1451* (2013.01); *G06F 17/30088* (2013.01); *G06F 17/30097* (2013.01); *G06F 17/30327* (2013.01); *G06F 17/30424* (2013.01); *G06F 17/30589* (2013.01); *G06F 2201/84* (2013.01)

(58) Field of Classification Search
CPC .................................................. G06F 17/3033
See application file for complete search history.

(56) References Cited

U.S. PATENT DOCUMENTS

| | | | | |
|---|---|---|---|---|
| 7,725,437 | B2 * | 5/2010 | Kirshenbaum ... | G06F 17/30097 707/640 |
| 7,856,437 | B2 * | 12/2010 | Kirshenbaum ... | G06F 17/30097 707/737 |
| 8,462,787 | B2 * | 6/2013 | Kobayashi ........... | H04L 12/56 370/390 |
| 2007/0112714 | A1 * | 5/2007 | Fairweather .......... | G06F 8/427 706/46 |
| 2007/0128899 | A1 * | 6/2007 | Mayer ................... | G06F 9/4406 439/152 |
| 2009/0037456 | A1 * | 2/2009 | Kirshenbaum ... | G06F 17/30097 |
| 2009/0037500 | A1 * | 2/2009 | Kirshenbaum ... | G06F 17/30097 |
| 2011/0035376 | A1 * | 2/2011 | Kirshenbaum ... | G06F 17/30097 707/737 |

OTHER PUBLICATIONS

"Git (software)", Wikipedia, the free encyclopedia, retrieved from the internet at https://en.wikipedia.org/wiki/Git, retrieved on Feb. 3, 2016, 12 pages.
"Content-addressable storage", Wikipedia, the free encyclopedia, retrieved from the internet at https://en.wikipedia.org/wiki/Content-addressable_storage, retrieved on Feb. 2, 2016, 4 pages.

* cited by examiner

*Primary Examiner* — Ashish K Thomas
*Assistant Examiner* — Mellissa M Ohba
(74) *Attorney, Agent, or Firm* — Fish & Richardson P.C.

(57) ABSTRACT

Methods, systems, and apparatus, including computer programs encoded on computer storage media, for storing data in a version control system. One of the methods includes maintaining, in a data store, a tree-structured index of files in which each leaf node stores an entry for each file in a plurality of files for a snapshot that includes a unique file identifier for the respective file; receiving a request for a particular file; generating a hash of a particular file path for the particular file; identifying, using the hash of the particular file path, a leaf node in the tree-structured index that includes an entry for the particular file; identifying, in the leaf node, an entry for the particular file path; obtaining, from the entry, the unique file identifier for the particular file in the data store; and using the unique file identifier for the particular file in response to the request.

26 Claims, 5 Drawing Sheets

CONTENT-ADDRESSABLE DATA STORAGE

BACKGROUND

This specification relates to how content-addressable storages store and retrieve files.

A version repository may create snapshots of files used for a project. Each snapshot may include multiple changes from its parent snapshots for the same project. The changes may be based on a status of the project, e.g., the status of an application during software development (in which new source code files are created during development), updates to a source code file (to make a method more efficient or remove a bug from the code), or to otherwise add additional features to the application.

Sometimes, a source code repository may use a content-addressable storage (CAS) to store snapshots for a code base. Because CAS systems never store duplicate copies of the same file, each subsequent snapshot in a CAS-based repository only uses storage to store the files that have changed, and refers to the unchanged files from previous snapshots. This may result in a substantial savings of storage requirements, relative to storing each snapshot in its entirety (often on the order of one hundred times less storage used).

SUMMARY

This specification describes a version control system (VCS) that provides fast indexing and retrieval when implemented on top of cloud-based storage systems. When storing a snapshot, the VCS generates a hash of the contents of each file, e.g., as an identifier for the file, receives data identifying a file path for each file, and generates a hash of the file path for each file. The VCS generates the file path hash using a numeral system with a predetermined base, e.g., base sixteen for a hexadecimal numeral system. The VCS uses a predetermined number of the leading values, e.g., left-hand values, of the file path hash to determine where to store the hash of the contents of the file, e.g., the identifier for the file in a VCS, in a tree-structured index in which each non-leaf node includes a quantity of child nodes that is at most equal to the predetermined base. For example, when using a hexadecimal numeral system to generate the file path hash, a root node may have at most sixteen children, each of those children may have at most sixteen children, and so on for each non-leaf node.

The VCS uses the predetermined number of leading values to balance access time and storage requirements. A higher number of leading values may increase access time but may reduce storage requirements for snapshots that are very similar to their parents. When the VCS determines a predetermined number of leading values as "03E" for a particular file, the VCS selects the first child node of the root node (corresponding to "0"), the fourth child node of the first selected node (corresponding to "3"), and the fifteenth child node of the second selected node (corresponding to "E"), and stores the hash of the contents of the particular file in the fifteenth child node of the second selected node, along with other data. The other data may include the actual file path, the entire hash of the file path, and potentially other additional data, e.g., whether the path identifies a file or a folder, or a combination of two or more of these.

To access the particular file, the VCS determines a key for the particular snapshot for which the particular file should be accessed and a file path for the particular file that identifies a location at which the particular file is stored. For instance, the VCS receives data that identifies the key and data that identifies the file path from a client device. The VCS uses the key for the particular snapshot to identify a particular root node for a tree in the VCS storage in which the storage location of the particular file will be identified. The VCS determines a file path hash using the file path and uses the predetermined number of leading values of the file path hash, as described above, to descend the tree to each respective child node in turn, in order to determine a file key for the particular file, e.g., the hash of the contents of the file. The VCS then uses the file key to retrieve the particular file.

In some implementations, the VCS system is implemented on a cloud storage system. In these implementations, the VCS system provides a particular file to a requesting device more quickly, while maintaining low data storage requirements, by using a tree-structured index to identify the key for files stored in the VCS system. For instance, the VCS may require at most a fixed number of requests, e.g., a depth of the tree-structured index potentially plus a small constant, to determine the key for a file and provide the key to the client device, e.g., irrespective of a directory structure of a project for which the file was created.

The subject matter described in this specification can be implemented in particular embodiments and may result in one or more of the following advantages. In some implementations, a version control system (VCS), such as a content-addressable storage (CAS) system, as described below may provide a file to a requesting device more quickly, may reduce data storage requirements, or both, compared to other systems e.g., by using a tree-structured index to identify the key for files stored in the VCS. In some implementations, a VCS as described below may provide a maximum number of requests to access a file, a maximum expected latency for all requests, or both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
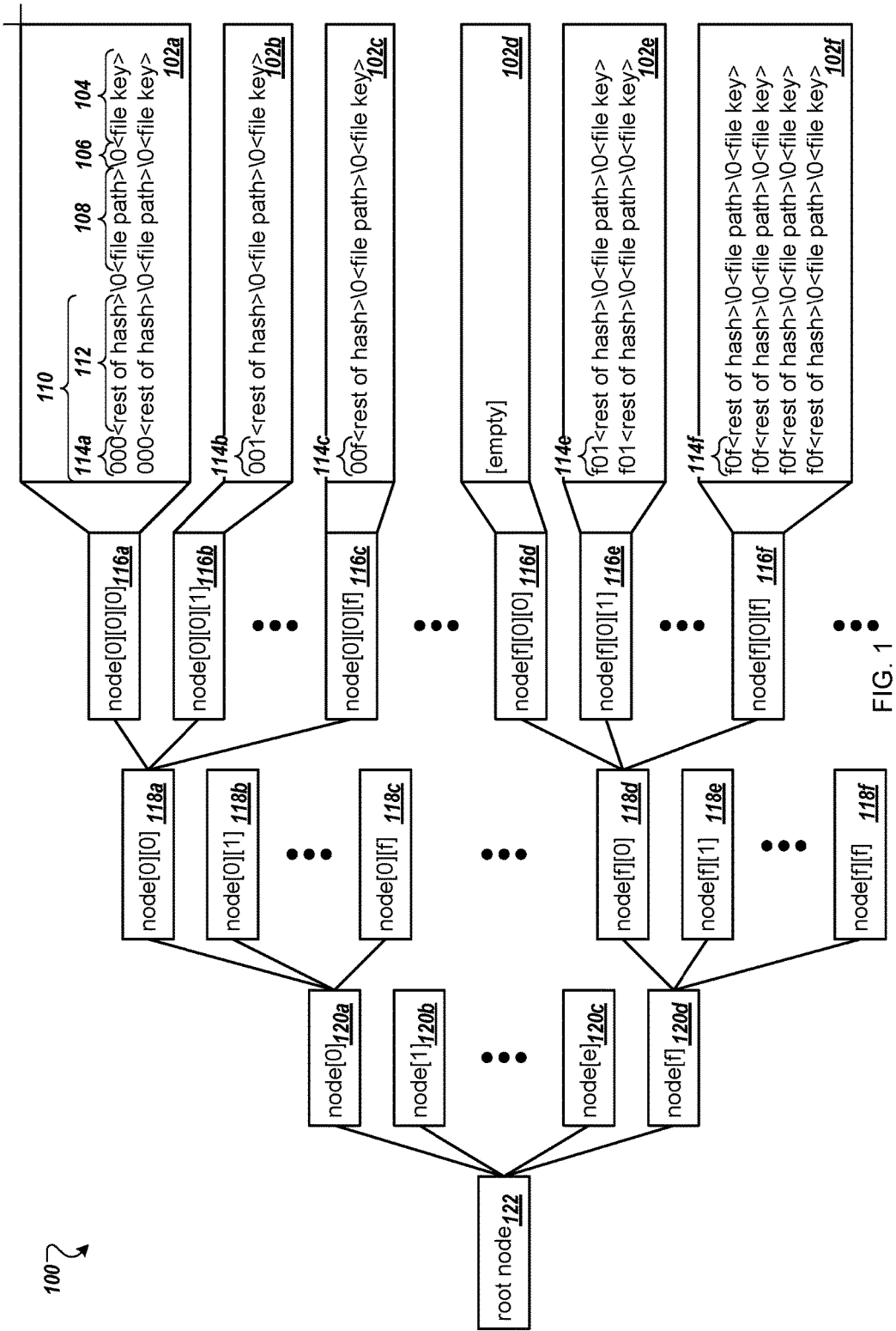
FIG. 1 is an example of a tree-structured index used by a version control system to store snapshots.

FIG. 1 is an example of a tree-structured index 100 used by a version control system to store snapshots of data, e.g., when multiple different versions of the data are created and each snapshot includes one version of the data. For instance, a system, e.g., a cloud storage system, may use the tree-structured index 100 to store snapshots of source code, snapshots of a work file directory, e.g., that includes spreadsheets and other types of non-source code files, to store snapshots of results files, e.g., which include analysis of source code files, to store snapshots of an SQL database, or a combination of two or more of these. One example of a version control system may include a content-addressable storage system.

For example, a system may generate, for each snapshot, the tree-structured index 100 that includes file identifiers that can be used to retrieve the files identified in the tree-structured index 100 from the version control system. For instance, leaf nodes in the tree-structured index 100 may include identifiers for each file in the snapshot and the system may use the identifiers to retrieve a respective file from the version control system. The system maintains the tree-structured index 100 in the version control system, e.g., to ensure that a copy of the tree-structured index 100 is stored in the version control system.

The system determines a file key 104 and determines a file path 108 for each of the files in the snapshot. For instance, the system may retrieve the file key 104 for a particular file from the version control system upon storing the particular file in the version control system. In some examples, the system may perform a hash of the contents of the particular file to generate the file key 104 for the file. The system may use any appropriate method to determine a file key for a file.

The file path 108 indicates the specific file system location within the snapshot at which a particular file is stored. For instance, the file path 108 indicates a particular network directory or file system location at which the particular file is stored for the snapshot. The system may receive a file path 108 for each of the files from a client device, a portion of a version control system, e.g., that stores the files for the snapshot, or another appropriate device or system.

The system uses the file path 108 for a particular file to determine a file path hash 110. The system uses the file path hash 110 to determine, for the particular file, a leaf node 116a-f in the tree-structured index at which to store data 102a-f that identifies the particular file. For example, when the file path hash 110 for the particular file indicates "xyz" as the leading values 114, the system selects the xth child of the root node, the yth child of the selected xth child, and the zth child of the selected yth child. The system uses the leaf node that is the zth child of the selected yth child to identify the particular file, e.g., in which to store or retrieve an identifier for the particular file when creating the tree-structured index 100 or to retrieve the identifier for the particular file to access the particular file.

For instance, when a first set of leading values 114a in the file path hash 110 are "000," the system stores the file path hash 110, the file path 108, and the file key 104 in data 102a for a first leaf node 116a accessed by navigating the tree-structured index 100 by selecting a root node 122, a first child node 120a of the root node 122, a first grandchild node 118a that is a first child of the first child node 120a, and then selecting the first leaf node 116a that is a first child of the first grandchild node 118a.

When the file path hash 110 indicates "001," as indicated by the second set of leading values 114b, the system selects the second leaf node 116b of the first grandchild node 118a. When the file path hash 110 indicates "00f," as indicated by the third set of leading values 114c, the system selects the sixteenth leaf node 116c of the first grandchild node 118a.

The system may store any appropriate data 102a-f for each of the leaf nodes 116a-f. For instance, the system may store the file path hash 110, that includes the leading values 114a-f and the rest of the file path hash 112, the file paths 108, or a combination of two or more of these, for each of the nodes. The system always includes the file keys 104 in the data 102a-f for the leaf nodes that identifies the files with file path hashes 110 that correspond to the leaf node 116a-f.

The system might not include the rest of the file path hash 112 for some of the leaf nodes. In some examples, the system might not store any data 102d for a particular leaf node 116d, e.g., when no files have a leading values 114 of a file path hash 110 that identify the particular leaf node 116d.

The system can use any appropriate delimiter to distinguish values for a particular file. In this example, the system uses a delimiter 106, e.g., "\0," between one or more values for a particular file. For instance, the system uses the delimiter 106 to determine which values in the data 102a-f represent the file path hashes 110, the file paths 108, and the file keys 104.

The system provides, for identification of a particular file, a root key for the root node 122 of the snapshot and the file path 108 for the particular file which includes a file name for the file. When the system receives a request for a file from a snapshot, the system generates the file path hash 110 using the file path 108. The system traverses the tree-structured index 100, stored as files in the version control system, identified by the root node 122 using the file path hash 110, e.g., the leading values 114 of the file path hash 110. The system determines a file key for the particular file at a leaf node in the tree-structured index 100 identified by the file path hash. Details of how the system accesses the files for the tree-structured index 100 are described in more detail below.

When generating a tree-structured index 100 for a particular snapshot, a system may generate the data 102a-f for the leaf nodes 116a-f and data for the other nodes 118-122. The system stores the data 102a-f for the leaf nodes 116a-f and the data for the other nodes 118-122 in the version control system, e.g., by providing the data 102a-f and the data for the other nodes 118-122 to the version control system. The version control system automatically de-duplicates the data, e.g., by only storing the data in memory that is not already included in the version control system.

For instance, the system stores an updated sixteenth leaf node 116c in the version control system, e.g., the data 102c in the version control system. The system generates a hash of the data 102c for the updated sixteenth leaf node 116c and stores the hash in the first grandchild node 118a along with hashes of the data 102a-b for the other leaf nodes identified by the first grandchild node 118a, e.g., data 102a for the first leaf node 116a and data 102b for the second leaf node 116b, and so on for any other nodes identified by the first grandchild node 118a. The system stores the updated first grandchild node 118a, that includes hashes of the contents of all leaf nodes referenced by the first grandchild node 118a, in the version control system.

The system generates a hash of the contents of the first grandchild node 118a and stores the hash in the first child node 120a. The system includes, in the first child node 120a, hashes of the contents of the other grandchild nodes 118b-c. The system stores the updated first child node 120a in the version control system.

The system creates the root node 122, for the particular snapshot, using hashes of the contents of the child nodes 120a-d. For instance, the system generates a hash for the updated first child node 120a, specific to the particular snapshot and stores the hash in the root node 122. The system uses the hashes for the child nodes 120b-d, which have not been changed since the preceding snapshot, from the preceding snapshot and stores the hashes in the root node 122.

Using this process, when storing data for a new snapshot, e.g., the particular snapshot, the system only allocates new storage for nodes on a path to a file which has been changed since a preceding snapshot was stored; the system uses data from the previous snapshot for the other nodes. The system may use the hash of the contents of the second grandchild node 118b, whether for the particular snapshot or the preceding snapshot, to access files identified in the leaf nodes to which the second grandchild node 118b points.

Further, in the example described above when only a file identified by the sixteenth leaf node 116c has changed, the system only stores the updated sixteenth leaf node 116c, the updated first grandchild node 118a, the updated first child node 120a, and the root node 122. The system uses data for the other nodes from a preceding snapshot. The data for some of the other nodes may be used by only one preceding snapshot, e.g., taken immediately prior to a current snapshot. In some examples, the data for some of the other nodes may be used by more than one preceding snapshot.

Figure 2:
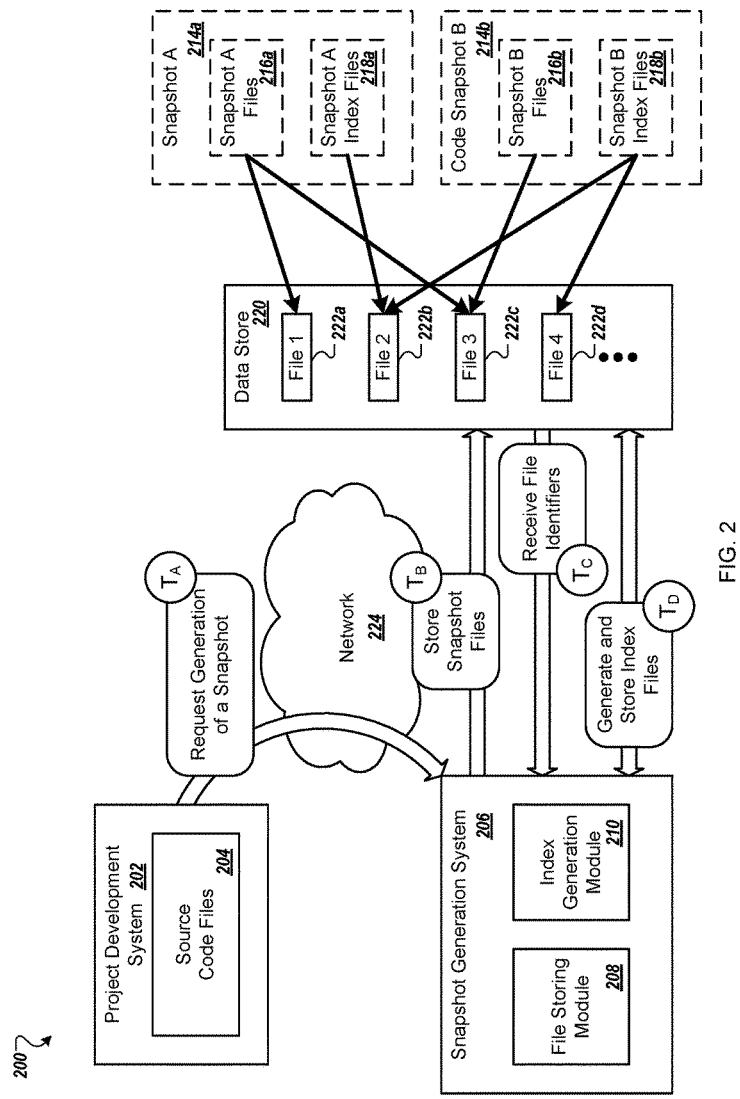
FIG. 2 shows an example of an environment in which a snapshot storage system stores snapshots in a data store.

FIG. 2 shows an example of an environment 200 in which a snapshot storage system stores snapshots in a data store 220. In FIG. 2, the snapshot storage system includes a snapshot generation system 206 that creates snapshots, such as a snapshot A 214a and a snapshot B 214b, and a data store 220. The snapshot generation system 206 creates the snapshots A and B 214a-b and stores files for the snapshots A and B 214a-b in the data store 220, as described in more detail below. The snapshot A 214a and the snapshot B 214b may be snapshots of source code files.

Each of the snapshots A and B 214a-b may refer to a file referenced by another snapshot, such as file 2 222b and file 3 222c, or a file that is not referenced by another snapshot, such as file 1 222a and file 4 222d. In some examples, the snapshot storage system may include multiple code snapshots, e.g., hundreds or thousands of snapshots. The snapshots may be for one set of data, e.g., one project, or multiple different sets of data, e.g., multiple projects. In some implementations, the snapshots may be for other types of data than code snapshots.

In some implementations, the snapshot storage system is a version control system. The snapshot storage system may store files in the data store 220, e.g., efficiently, for an environment in which some files included in the data store 220 are or will be referenced by multiple snapshots. In some examples, the data store 220 may be part of a content-addressable storage.

A project development system 202, as shown in FIG. 2, includes source code files 204 for a particular project. For instance, the source code files 204 may be for a particular application that is in development such as a game or a productivity application. In some implementations, the environment 200 may be used to store a snapshot of any appropriate type of file in the snapshot storage system.

The project development system 202 may connect with a user device (not shown) and receive user input from the user device. In some examples, the project development system 202 may be included on a user device. The user input may indicate changes to one or more of the files in the source code files 204 for the particular project, a request to view one of the files for the particular project, or any other appropriate type of input.

The project development system 202 may receive a request to create a snapshot of the source code files 204 for the particular project or otherwise determine that a snapshot should be created, e.g., based on a schedule. For example, the project development system 202 may receive a message from the user device that indicates a request to create a snapshot of the source code files 204 for the particular project.

At time TA, the project development system 202 sends a request to the snapshot generation system 206 for generation of a snapshot. The request may identify the particular project, the source code files 204, or may be specific to the project development system 202, e.g., when the project development system 202 is used to create files for a single project. The project development system 202 may send the request to the snapshot generation system 206 in response to receipt of the user input indicating the request to create a snapshot of the source code files 204.

The snapshot generation system 206 receives the request from the project development system 202 to generate a snapshot. For instance, the request may identify a particular project, e.g., source code project, to which the snapshot relates and a location or locations at which data for the particular project are stored. The snapshot generation system 206 may receive the request from the project development system 202 as a checkpoint as a project is developed. The request may indicate a particular computer or particular computers that include data for the snapshot, e.g., a requesting computer that includes the data for the snapshot or another computer.

In some examples, the project development system 202 may be part of the same system as the snapshot generation system 206. For instance, the same computer or computers may host the project development system 202 and the snapshot generation system 206.

The snapshot generation system 206 stores the snapshot files in the data store 220 during time TB. For instance, the snapshot generation system 206 receives the source code files 204 from the project development system 202. The snapshot generation system 206 provides the source code files 204 to the data store 220.

The snapshot storage system stores the source code files 204 in the data store 220 such as on disk. For instance, the snapshot storage system stores snapshot A files 216a as part of a snapshot A 214a for the particular project in the data store 220.

The snapshot storage system, e.g., the data store 220, generates an identifier for each of the files in the snapshot A files 216a. For instance, the snapshot storage system determines an identifier for each file that uniquely identifies the corresponding file in the data store 220 of the snapshot storage system. The snapshot storage system may generate a secure hash algorithm 1 (SHA-1) hash for each file as the respective file identifier that uniquely identifies the corresponding file in the memory of the snapshot storage system. The snapshot storage system may use any appropriate method to generate the file identifiers for each of the files.

The snapshot generation system 206 receives, during time TC, the identifiers for the files in the snapshot A files 216a from the snapshot storage system such as from the data store 220. For instance, the snapshot generation system 206 receives one or more messages from the snapshot storage system that each include some of the identifiers for the files in the snapshot A files 216a.

The snapshot generation system 206 generates, for each file in the snapshot A files 216a, a hash of the file path at which the file is stored in the source code files 204. For example, the snapshot generation system 206 determines, for each file, a file path that indicates a particular network directory or file system location at which the respective file is stored. The snapshot generation system 206 uses any appropriate hash algorithm to generate the hash of the file path. In some examples, the snapshot generation system 206 may use a hash algorithm specific to a particular numeral system that corresponds to a maximum number of children for each node in a tree-structured index. For instance, when the particular numeral system has a radix of ten each node in a tree-structured index can have at most ten child nodes and when the particular numeral system has a radix of sixteen each node in the tree-structured index can have at most sixteen child nodes.

The snapshot generation system 206 selects, for each file, a particular leaf node in a tree-structured index using the file path hash. For instance, the snapshot generation system 206 uses a predetermined number of leading or trailing characters from the file path hash for a particular file to determine a path through the tree-structured index that identifies the particular leaf node at which to store the identifier for the particular file.

The snapshot generation system 206 stores, in the particular leaf node, the identifier for the file. The snapshot generation system 206 may store the file path, the file path hash, or both, in the particular leaf node. The snapshot generation system 206 may use a delimiter, such as ":" or ";" or another appropriate delimiter to separate values for a file, e.g., to separate the file identifier from the file path.

The snapshot generation system 206 provides data for the leaf nodes of the tree-structured index, that include file identifiers, to the data store 220 as part of the process, at time TD, to generate the tree-structured index, as described in more detail below. For example, the snapshot generation system 206 provides data for each of the leaf nodes to the data store 220 with a request to store the data in a memory of the data store 220. The data for a particular leaf node includes identifiers for the files whose file path hashes indicate the particular leaf node. The data for the particular leaf node may include, for each file, the corresponding file path at which the file is stored, the file path hash, or both.

The data store 220 stores the data for the leaf nodes as some of the snapshot A index files 218a in the snapshot A 214a. For instance, the data store 220 stores the leaf nodes, e.g., that include the file 2 222b, in memory and generates identifiers for the leaf nodes. The snapshot storage system, e.g., the data store 220, provides the identifiers for the leaf nodes to the snapshot generation system 206.

In some implementations, the snapshot generation system 206 sends data for leaf nodes that do not include any identifiers, e.g., "empty" leaf nodes, to the data store 220 and receives, in response, an identifier for the leaf node. In some examples, the snapshot generation system 206 may use a "dummy" identifier for empty leaf nodes and not store data for the empty leaf nodes, that do not identify any files for the snapshot, in the data store 220. For instance, the snapshot generation system 206 may use a hash of the empty string as an identifier for empty leaf nodes. When the snapshot generation system 206 determines that a particular parent node in a tree-structured index has at least one child node that is empty, e.g., when the child node does not identify any files for a snapshot, the snapshot generation system 206 may store the hash of the empty string in the parent node as the identifier for the empty child node.

In some implementations, when storing node identifiers in a parent node for the node's children, the snapshot generation system 206 includes a unique identifier for each of the child nodes, e.g., when each of the identifiers is generated using the contents of the respective child node. When a particular parent node includes multiple child nodes that are each empty nodes, the snapshot generation system 206 may use the same identifier for each of the empty child nodes. For instance, the snapshot generation system 206 may include a hash of the empty string in a parent node for each empty child node of the parent node.

The snapshot generation system 206 uses the identifiers for the leaf nodes to create a subsequent level of non-leaf nodes in the tree-structured index. For example, the snapshot generation system 206 determines, for each non-leaf node in the subsequent level, the leaf nodes that connect to the particular non-leaf node in the tree-structured index and stores the identifiers for those leaf nodes in the particular non-leaf node.

The snapshot generation system 206 includes the identifiers for the leaf nodes in a particular order. For example, as described above, the snapshot generation system 206 uses the tree-structured index to determine a particular path through the tree-structured index that indicates where to store a file identifier. When the path indicates index "0", the snapshot generation system 206 selects the first identifier in a particular node referenced by index "0" and uses that first identifier to request a subsequent file, e.g., another node or a source code file. Similarly, when the path indicates index "F" for a particular node, the snapshot generation system selects the sixteenth identifier in the particular node referenced by index "F" and uses the sixteenth identifier to request a subsequent file.

The snapshot generation system 206 continues, during time TD, the process of generating index nodes, providing data for the index nodes to the data store 220, e.g., for storage in memory, receiving identifiers for the index nodes, and generation of a subsequent index node until receiving a root identifier for a root node in the tree-structured index for the snapshot A 214a. The data store 220 stores each of the index node files in memory, e.g., as part of the snapshot A index files 218a.

The snapshot generation system 206 may provide the identifier for the root node to the project development system 202. For example, the project development system 202 may later use the root node identifier for the root node to retrieve a file from the snapshot A 214a. The project development system 202 may use the root node identifier to request all files for the snapshot A 214a, or to request a particular file from the snapshot A 214a, e.g., using the root node identifier and a file path for the particular file.

The snapshot generation system 206 or a snapshot retrieval system included in the snapshot storage system may receive a request for retrieval of a file for a particular snapshot. For instance, the snapshot retrieval system may receive a request from the project development system 202 for access to a particular snapshot, e.g., using a root node identifier for the particular snapshot, for access to a particular file, e.g., using a root node identifier for the snapshot in which the particular file is stored along with a file path at which the file was stored, or both.

The snapshot retrieval system, in response for access to a particular snapshot, uses the root node identifier to request all of the files for the snapshot from the data store 220. For example, the snapshot retrieval system creates a copy of the requested snapshot in a memory of the snapshot retrieval system.

When the snapshot generation system 206 later receives another request from the project development system 202 to create a subsequent snapshot of the source code files 204 for the particular project, the snapshot generation system 206 repeats the process described here with reference to creation of the snapshot A 214a in the data store 220. For instance, the snapshot generation system 206 provides the source code files 204 to the data store 220 for creation of the snapshot B 214b that includes snapshot B files 216b and snapshot B index files 218b and, in response, receives respective identifiers for use in creating the snapshot, e.g., for non-root nodes, or for later use in accessing the snapshot, e.g., with the root node identifier.

When a particular file is the same for the snapshot A 214a and the snapshot B 214b, e.g., the contents of the file are unchanged such as for the file 3 222c, the data store 220 includes only a single copy of the particular file in memory. For instance, the data store 220 may store the particular file in memory twice, once during the creation of each snapshot. In some examples, when the data store 220 references files based on a hash of the contents of the file, the second time the data store 220 stores the particular file in memory, the data store 220 overwrites the first instance of the particular file, e.g., stores the particular file in the same location in memory.

For example, when the contents of a particular leaf node in the tree-structured indexes for the snapshot A 214a and the snapshot B 214b are the same, such as for the file 2 222b, the particular leaf node has the same identifier and the data store 220 includes only a single copy of the particular leaf node in memory. This allows the data store 220 to store data in memory once and use that data for multiple snapshots, e.g., to reduce memory requirements.

In some examples, when a location at which a file is stored in the source code files 204 has changed between snapshots and the contents of the file have not changed, the snapshot storage system does not store new data for the contents of the file in a memory of the data store 220. For instance, the snapshot storage system generates the same identifier for the file for both snapshots. However, the snapshot generation system 206 may include the identifier for the file in a different leaf node of the tree-structured index based on the file path hash of the new file path for the file, e.g., when the leading values of the file path hash change. In this example, although the source files of two snapshots may be identical, the indexes of the two snapshots may still differ because of the different location at which the file was stored in the source code files 204.

The snapshot generation system 206 may determine a maximum number of child nodes for each internal node, e.g., non-leaf node, of a tree-structured index, including a root node in the tree-structured index, using a number of files included in the source code files 204 for the particular project. For instance, when the snapshot generation system 206 determines that the particular project has about a few thousand files the snapshot generation system 206 may determine a numeral system with which to hash file paths and that indicates a maximum number of child nodes for each of the internal nodes using the quantity of the few thousand files. The snapshot generation system 206 may determine for a project that has at most twenty thousand files to use a hexadecimal numeral system which limits each of the internal nodes to at most sixteen child nodes.

In some examples, the snapshot generation system 206 may use a predicted maximum number of files for the particular project to determine a maximum number of child nodes for each internal node of the tree-structured index. For instance, when the project development system 202 initially stores the source code files 204 for the particular project, the source code files may include only a few hundred files and may be expected to later include a few thousand files, e.g., once the particular project is closer to the end of a particular development milestone.

In some implementations, the snapshot generation system 206 may determine a depth of a tree-structured index using a number of files included in a project, e.g., currently or a predicted maximum. For instance, the snapshot generation system 206 may determine to use a tree-structured index with a root node, two layers of internal nodes below the root node, and a layer of leaf nodes that identify file keys when a project has a few thousand files. When the snapshot generation system 206 determines that an average number of files identified by each of the leaf nodes exceeds a threshold value, e.g., sixteen, the snapshot generation system 206 may include another layer of internal nodes in the tree-structured index.

The snapshot generation system 206 uses a number of leading values from a file path hash based on the depth of the tree-structured index. For instance, when the tree-structured index includes two layers of internal nodes below the root node, the snapshot generation system 206 uses three values from the file path hashes to determine leaf nodes at which to store file keys. When the tree-structured index includes three layers of internal nodes below the root node, the snapshot generation system 206 uses four values from the file path hashes to determine leaf nodes at which to store file keys.

In some implementations, the depth of the tree-structured index affects a number of times the snapshot generation system 206 or a snapshot retrieval system accesses the data store 220. For instance, when the project development system 202 requests a particular file from the snapshot B 214b from the snapshot retrieval system, the snapshot retrieval system receives a root node identifier for the tree-structured index of the snapshot B 214b from the project development system 202 and a file path, e.g., for a file to which the project development system 202 is requesting access. In response, the snapshot retrieval system generates a file path hash using the file path for the file.

The snapshot retrieval system requests the root node for the snapshot B 214b from the data store 220 using the root node identifier and receives the contents of the root node from the data store 220 in response. The snapshot retrieval system uses a first character in the file path hash to select a particular node identifier included in the contents for the root node. For instance, the snapshot retrieval system uses the first character as an index to identify the particular node identifier in a list of node identifiers included in the root node.

The snapshot retrieval system uses the particular node identifier to request an internal node of the tree-structured index referenced by the particular node identifier from the data store 220. The snapshot retrieval system receives the contents of the particular node from the data store 220 in response.

The snapshot retrieval system repeats the process of requesting nodes from the data store 220 and selecting node identifiers in the received node until the snapshot retrieval system receives data for a leaf node from the data store 220. For instance, the snapshot retrieval system receives data for a root node specific to a particular snapshot, receives data for each internal node below the root node, and data for a leaf node.

In response to receipt of the leaf node, the snapshot retrieval system determines a file identifier for the particular file using the file path, the file path hash, or both, for the particular file. The snapshot retrieval system requests the particular file from the data store 220 and provides the particular file to the project development system 202.

As described above, the snapshot generation system 206 may select a depth of the tree-structured index to set a maximum limit to a number of times the snapshot generation system 206 or a snapshot retrieval system may access the data store 220 to determine a file key for a particular file, to receive a copy of the particular file, or both. For instance, when the tree-structured index includes a root node, two layers of internal nodes below the root node, and a layer of leaf nodes that include file keys, e.g., a maximum depth of four, the snapshot retrieval system may determine a file key for the particular file after four queries to the data store 220.

The root nodes for two different snapshots, when each of the snapshots contains different contents, are always different. For instance, the root node B for the snapshot B 214*b* includes at least one node identifier that is not included in the node identifiers included in the root node A for the snapshot A 214*a*.

In some implementations, when two different snapshots made at different points in time have the same contents, the two snapshots have the same root node. For instance, the snapshots are associated with different dates that indicate the time at which the snapshot was generated but the tree-structured index and the contents of the two snapshots in the version control system are the same.

In some implementations, the snapshot generation system 206 or a snapshot retrieval system may provide access to files in the snapshots 214*a-b* through an interactive website. For instance, the snapshot generation system 206 may receive a request from the project development system 202 for a webpage that provides access to the snapshots 214*a-b*. In response, the snapshot generation system 206 provides instructions for the presentation of the webpage to the project development system 202, e.g., implemented on a computer, to cause the project development system 202 to generate the webpage. In these implementations, the project development system 202 does not include a local clone of data stored in the snapshot storage system, e.g., of either the snapshot A 214*a* or the snapshot B 214*b*. For instance, the source code files 204 may have changed since creation of the snapshots. In some examples, the project development system 202 may not permanently store the source code files 204 in memory and may request a most recent snapshot of the source code files from the snapshot generation system 206, e.g., to allow a developer access to the source code files 204.

In some implementations, the snapshot storage system may be part of a cloud storage system. For instance, the cloud storage system may include one or more memories, implemented on different computers in the cloud storage system, that each include at least one memory that stores a portion of the data for the snapshot storage system.

In some implementations, the snapshot storage system, e.g., the data store 220, may use delta compression to store data in memory. For instance, the snapshot storage system may use a delta compression technique to store blobs in a memory of the data store 220.

The project development system 202 may be implemented on a computer, such as a personal computer, a mobile communication device, or another device that can send and receive data over a network 224. The network 224, such as a wide area network (WAN), the Internet, or a combination thereof, connects the project development system 202, the snapshot generation system 206, and the data store 220, e.g., the servers that implement the snapshot generation system 206 and the servers that implement the data store 220.

In some implementations, the snapshot generation system 206 may include some or all of the data store 220. For instance, the snapshot generation system 206 may be implemented on the same computers as the data store 220.

The snapshot storage system is an example of a system implemented as computer programs on one or more computers in one or more locations, in which the systems, components, and techniques described herein are implemented. For instance, the snapshot storage system may include multiple servers in two or more physical locations. Each of the servers may include a portion of the snapshot storage system, e.g., memories that store data for part of the snapshot storage system.

Figure 3:
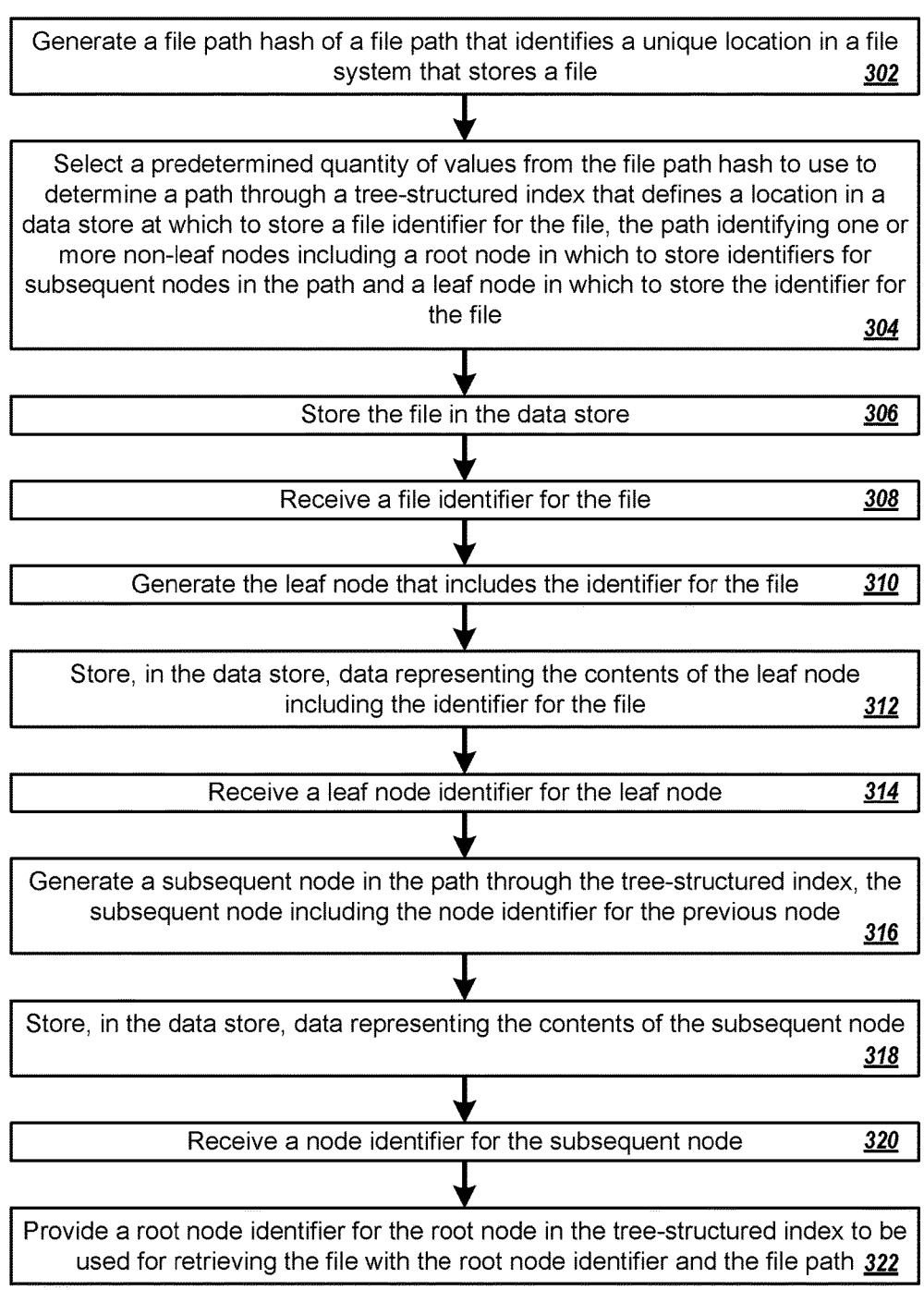
FIG. 3 is a flow diagram of a process for providing a root identifier to be used for retrieving a file.

FIG. 3 is a flow diagram of a process 300 for providing a root identifier to be used for retrieving a file. The process 300 can be implemented by one or more computer programs installed on one or more computers. For example, the process 300 can be used by the snapshot storage system from the environment 200.

A snapshot storage system generates a file path hash of a file path that identifies a unique location in a file system that stores a file (302). The snapshot storage system may use a predetermined numeral system to generate the file path hash.

In some examples, the snapshot storage system may generate file path hashes for multiple files. For instance, the snapshot storage system may create file path hashes for each file included in a particular project, e.g., as part of a process to create a snapshot of the files used for the particular project.

The snapshot storage system selects a predetermined quantity of values from the file path hash to use to determine a path in a tree-structured index that defines a location in a data store at which to store a file identifier for the file, the path identifying one or more non-leaf nodes in which to store identifiers for subsequent nodes in the path and a leaf node in which to store the identifier for the file (304). For instance, the snapshot storage system determines the predetermined quantity of values based on a depth of the tree-structured index. In some examples, the snapshot storage system may select the predetermined quantity using a maximum number of communications, e.g., requests and responses, between the snapshot storage system and the version control system.

The snapshot storage system stores the file in the data store (306). For instance, the snapshot storage system provides the file to the data store with a request to store the file in memory.

The snapshot storage system receives a file identifier for the file (308). For instance, the snapshot storage system receives the file identifier from the data store that the data store generated using the contents of the file. The data store may use a predetermined numeral system or another appropriate hash to generate the file identifier.

The snapshot storage system generates the leaf node that includes the identifier for the file (310). For example, the snapshot storage system selects the identifiers for all files that include the leaf node on the respective path that defines a location in the data store at which to store the respective file identifier. The snapshot storage system may store the identifiers in the leaf node in a particular order, e.g., sorted according to file path, file path hash, identifier value, or another appropriate value. The snapshot storage system may use any appropriate method to sort the file identifiers in a stable manner.

The snapshot storage system may sort the identifiers for the files in the leaf nodes so that changes to a leaf node are predictable. For instance, if a first snapshot includes a particular file and a second snapshot does not include the file, a leaf node for the particular file will be updated for the second snapshot to not include a file path or a file identifier for the particular file. When a third snapshot includes the particular file, e.g., without any change to the particular file from the first snapshot, the snapshot storage system may reference data for the leaf node from the first snapshot as identifying the particular file, assuming that all other files referenced by the leaf node are the same in the third snapshot as in the first snapshot. The snapshot storage system is able to use the same leaf node because the entries in the leaf node are sorted in the same way and the entries in the leaf node will be in the same order, e.g., compared to appending data for the file to the bottom of the data for the leaf node.

The snapshot storage system stores, in the data store, data representing the contents of the leaf node including the identifier for the file (312). For instance, the snapshot storage system provides the data representing the contents of the leaf node to the data store with a request to store the data in memory. The data store may use the same method used to generate the file identifier to generate a leaf node identifier. In some examples, the data store may use a different method to generate the leaf node identifier than the method used to generate the file identifier.

The snapshot storage system receives a leaf node identifier for the leaf node (314). For example, the data store determines the leaf node identifier and provides the leaf node identifier to the snapshot storage system.

The snapshot storage system generates a subsequent node in the path through the tree-structured index, the subsequent node including the node identifier for the previous node (316). For instance, as described above, the snapshot storage system stores the leaf identifier in a first internal node. The snapshot storage system includes the leaf identifiers for all leaves that connect to the first internal node in the tree-structured index in the first internal node.

The snapshot storage system stores, in the data store, data representing the contents of the subsequent node (318). For example, the snapshot storage system provides data for the first internal node to the data store with a request to store the data in memory.

The snapshot storage system receives a node identifier for the subsequent node (320). For instance, the data store stores the subsequent node in memory and generates the node identifier for the subsequent node. The data store provides the node identifier to the snapshot storage system.

The snapshot storage system repeats steps 316 through 320 for each non-leaf node on the path through the tree-structured index. For instance, when the path includes a root node, two other non-leaf nodes, and a leaf node, the snapshot storage system performs steps 316 through 320 three times, once for each of the other non-leaf nodes and then once for the root node.

The snapshot storage system provides, for the root node in the tree-structured index, the root identifier to be used for retrieving the file with the root identifier and the file path (322). The snapshot storage system may provide the root identifier to one or more computers to allow each of the computers access to the file using the root identifier and the file path for the file.

The order of steps in the process 300 described above is illustrative only, and providing the root identifier to be used for retrieving the file can be performed in different orders. For example, the snapshot storage system may receive the file identifier and then generate the file path hash. In some examples, the snapshot storage system may store the file in the data store and then generate the file path hash for the file.

Figure 4:
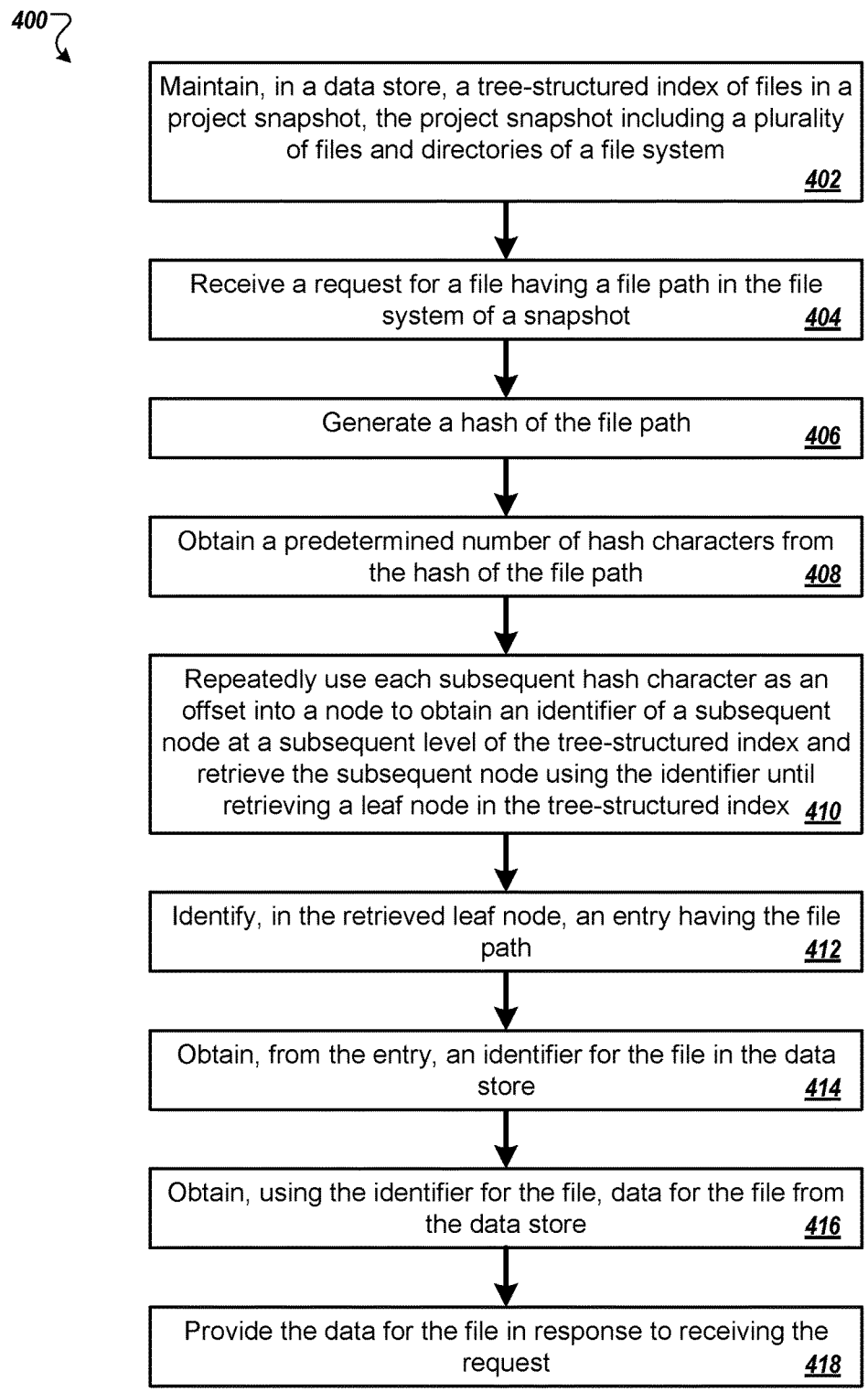
FIG. 4 is a flow diagram of a process for retrieving a file from a data store and providing the file to a device.

FIG. 4 is a flow diagram of a process 400 for retrieving a file from a data store and providing the file to a device. The process 400 can be implemented by one or more computer programs installed on one or more computers. For example, the process 400 can be used by the snapshot storage system or the project development system 202 from the environment 200.

A snapshot storage system maintains, in a data store, a tree-structured index of files in a project snapshot, the project snapshot including a plurality of files and directories of a file system (402). For instance, the snapshot storage system may communicate with a cloud storage system that includes the data store. The snapshot storage system provides files for the tree-structured index to the data store that stores data, e.g., blobs, for each of the files in the tree-structured index and corresponding files for the project snapshot. The files for the snapshot may be source code files or any other appropriate type of file.

The data store may maintain the tree-structured index as a set of files stored in memory. Each file in the tree-structured index that represents a non-leaf node in the tree includes a list of identifiers for child nodes. For instance, a node may include a list of child-number, e.g., index, and file-identifier pairs for the node's children such that the file-identifier is used to access the corresponding child node in the data store. Each non-empty leaf node includes identifiers for files from the corresponding snapshot. Each non-empty leaf node may include a file path for each file, a hash of the file path for each file, or both.

The snapshot storage system receives a request for a file having a file path in the file system of a snapshot (404). The snapshot storage system may receive the request from a user device, e.g., the project development system 202 from the environment 200. The snapshot storage system may receive a request for retrieval of a particular snapshot from the data store or a request for a particular file.

The snapshot storage system generates a hash of the file path (406). For example, the snapshot storage system uses any appropriate method to generate the hash of the file path. The snapshot storage system may generate the hash using a predetermined numeral system with a particular radix.

The snapshot storage system obtains a predetermined number of hash characters from the hash of the file path (408). For instance, the snapshot storage system may obtain the leftmost two, three, or four characters from the hash of the file path.

The snapshot storage system repeatedly uses each subsequent hash character as an offset into a node to obtain an identifier of a subsequent node at a subsequent level of the tree-structured index and retrieves the subsequent node using the identifier until retrieving a leaf node in the tree-structured index (410). For instance, the snapshot storage system may perform one or more steps described below with reference to the process 500 to retrieve the leaf node in the tree-structured index.

The snapshot storage system may obtain a root node for the snapshot from the data store. The snapshot storage system uses the first hash character as an index value to determine which entry in the root node represents the key of the next node of the index tree on the path to the leaf node with an identifier for the file, e.g., an index value of zero represents the first entry in the root node, an index value of one represents the second entry in the root node, and so on.

The snapshot storage system uses the entry to determine an identifier for the subsequent node. The snapshot storage system retrieves the subsequent node from the data store using the identifier for the subsequent node.

The snapshot storage system identifies, in the retrieved leaf node, an entry having the file path (412). The snapshot storage system obtains, from the entry, an identifier for the file in the data store (414). For example, the snapshot storage system uses a delimiter to determine which portion of the entry is the identifier for the file.

The snapshot storage system obtains, using the identifier for the file, data for the file from the data store (416). For instance, the snapshot storage system may use the identifier to retrieve data for the file from the data store.

The snapshot storage system provides the data for the file in response to receiving the request (418). For example, the snapshot storage system provides the data to the user device that requested the file. In some examples, the snapshot storage system stores the file in a memory, e.g., when retrieving all files for a particular snapshot. The snapshot storage system may allow a user device to browse the files for the particular snapshot once all files for the snapshot have been retrieved from the data store.

In some implementations, the process 400 can include additional steps, fewer steps, or some of the steps can be divided into multiple steps. For example, the snapshot storage system may perform one or more steps from the process 300 as part of the process 400. In some examples, the snapshot storage system may perform one or more steps from the process 500, e.g., as part of step 410.

Figure 5:
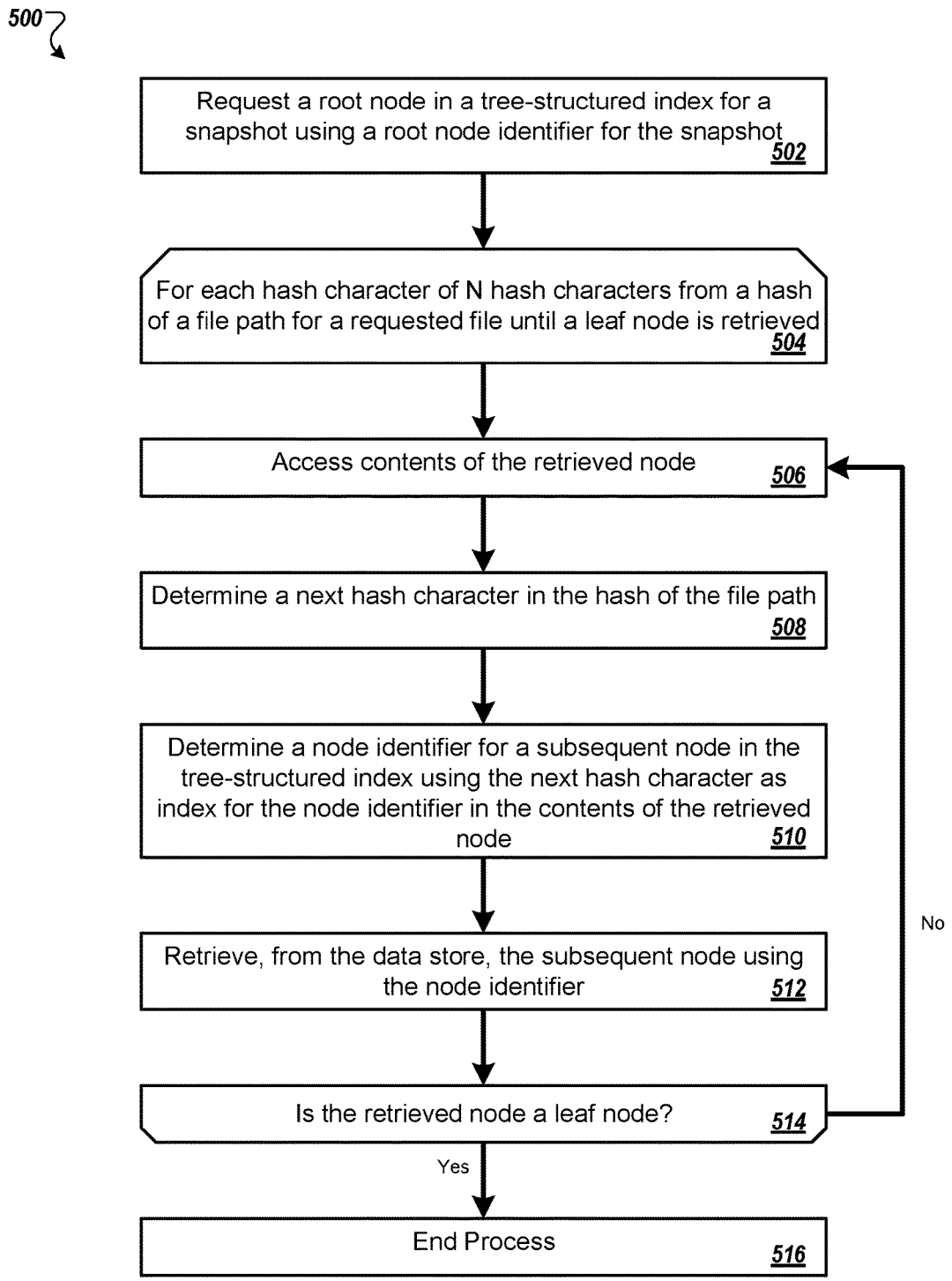
FIG. 5 is a flow diagram of a process for retrieving a leaf node that includes a file identifier using a hash of a file path for the file.

FIG. 5 is a flow diagram of a process 500 for retrieving a leaf node that includes a file identifier using a hash of a file path for the file. The process 500 can be implemented by one or more computer programs installed on one or more computers. For example, the process 500 can be used by the snapshot storage system or the project development system 202 from the environment 200.

A snapshot storage system requests a root node in a tree-structured index for a snapshot using a root node identifier for the snapshot (502). For instance, the snapshot storage system provides a data store with the root node identifier as part of a request for the contents of the root node. The request may be part of a request for a file from the data store.

The snapshot storage system begins a process loop for each hash character of N hash characters from a hash of a file path for a requested file until a leaf node is retrieved (504). The snapshot storage system accesses contents of the retrieved node (506). During the first iteration of the process loop, the snapshot storage system accesses the contents of the retrieved root node. For instance, the snapshot storage system may receive contents of the root node from the data store and access the contents of the received root node.

The snapshot storage system determines a next hash character in the hash of the file path (508). For example, during the first iteration, the snapshot storage system selects the first hash character from the file path hash, e.g., the leftmost value or the rightmost value from the file path hash, as an index value. During the second iteration, the snapshot storage system selects the second hash character from the file path hash, and so on.

The snapshot storage system determines a node identifier for a subsequent node in the tree-structured index using the next hash character as index for the node identifier in the contents of the retrieved node (510). For instance, during the first iteration, the snapshot storage system uses the first hash character as an index to an entry in the root node to determine an identifier for a child node of the root node.

The snapshot storage system retrieves, from the data store, the subsequent node using the node identifier (512). The snapshot storage system may provide the node identifier to the version control system with a request for data, e.g., a blob, identified by the node identifier. In response, the snapshot storage system receives the data for the subsequent node.

The snapshot storage system determines whether the retrieved node is a leaf node (514). The snapshot storage system may use a depth of the tree-structured index, a number of hash characters used as index values, the contents of the retrieved node, or another appropriate method, to determine whether the retrieved node is a leaf node.

For instance, the snapshot storage system may determine whether the contents of the retrieved node include file paths. If so, the snapshot storage system determines that the retrieved node is a leaf node. If not, e.g., and the contents of the retrieved node include only identifiers or only identifiers and index values, the snapshot storage system determines that the retrieved node is a non-leaf node.

In response to determining that the retrieved node is a leaf node, the snapshot storage system ends the process 500 (516). For instance, the snapshot storage system uses the contents of the retrieved leaf node to determine a file identifier, e.g, as part of the process 400.

In some implementations, the process 500 can include additional steps, fewer steps, or some of the steps can be divided into multiple steps. For example, the snapshot storage system may perform one or more steps from the process 400 as part of the process 500.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Embodiment 1 is a method comprising: maintaining, in a data store, a tree-structured index of files in a project snapshot, the project snapshot comprising a plurality of files and directories of a file system, wherein the tree-structured index has a root node at a root level, parent nodes at N intermediate levels, and a plurality of leaf nodes at a leaf level, wherein each node is represented as a file having a corresponding identifier in the data store, wherein each non-leaf node stores a plurality of identifiers of nodes descendant from the non-leaf node in the tree-structured index, the plurality of identifiers being stored at corresponding offsets within the non-leaf node, and wherein each leaf node stores an entry for each of one or more files of a plurality of files in the file system, wherein each entry comprises a representation of a file path in the directories of the file system at which the file is stored, and a unique file identifier; receiving a request for a particular file having a particular file path in the file system of a snapshot; generating a hash of the particular file path; identifying, using the hash of the particular file path, a leaf node in the tree-structured index that includes an entry for the particular file; identifying, in the leaf node, an entry corresponding to the particular file path; obtaining, from the entry, the unique file identifier for the particular file in the data store; and using the unique file identifier for the particular file in response to the request.

Embodiment 2 is the method of embodiment 1, wherein identifying, using the hash of the particular file path, the leaf node in the tree-structured index that includes an entry for the particular file comprises: obtaining N hash characters from the hash of the particular file path; and performing the following operations until retrieving a leaf node in the tree-structured index: repeatedly using each subsequent hash character from the N hash characters as an offset into a node to obtain an identifier of a subsequent node at a subsequent level of the tree-structured index, and retrieving the subsequent node using the identifier.

Embodiment 3 is the method of embodiment 2, wherein obtaining the N hash characters from the hash of the file path comprises obtaining N leftmost hash characters from the hash of the file path.

Embodiment 4 is the method of any one of embodiments 2 through 3, wherein maintaining, in the data store, the tree-structured index of files in the project snapshot comprises maintaining, in the data store, the tree-structured index of files in the project snapshot, wherein each non-leaf node stores a list of a predetermined number of identifiers of nodes descendant from the non-leaf node in the index; obtaining the N hash characters from the hash of the particular file path comprises obtaining the N hash characters each of which are for a numeral system with a radix comprising the predetermined number; and repeatedly using each subsequent hash character as an offset into the node to obtain the identifier of the subsequent node at the subsequent level of the index comprises repeatedly using each subsequent hash character as an offset into the list of the predetermined number of identifiers stored in the node to obtain the identifier of the subsequent node at the subsequent level of the index.

Embodiment 5 is the method of any one of embodiments 1 through 4, wherein maintaining, in the data store, the tree-structured index of files in a project snapshot in which each leaf node entry includes the unique file identifier comprises wherein maintaining, in the data store, the tree-structured index of files in a project snapshot in which each leaf node entry includes a hash of the data included in the file.

Embodiment 6 is the method of any one of embodiments 1 through 5, wherein each entry in a leaf node comprises the hash of the file path of the file, the path of the file, and a unique file identifier for the corresponding file.

Embodiment 7 is the method of any one of embodiments 1 through 6, wherein each entry in a leaf node comprises the hash of the file path of the file, and a unique file identifier for the corresponding file.

Embodiment 8 is the method of any one of embodiments 1 through 7, wherein each entry in a leaf node comprises the file path of the file, and a unique file identifier for the corresponding file.

Embodiment 9 is the method of any one of embodiments 1 through 8, wherein receiving the request for the particular file having the particular file path in the file system of the snapshot comprises receiving the request that identifies i) a root identifier for a particular root node of the snapshot and ii) the particular file path of the particular file in the file system of the snapshot.

Embodiment 10 is the method of any one of embodiments 1 through 9, comprising: generating, for a particular file from the plurality of files, a file path hash of a file path that identifies a unique location in the file system for the snapshot at which the particular file is stored; determining a path through the tree-structured index that defines a location in the data store at which to store a unique file identifier for the file using the file path hash, the path identifying one or more non-leaf nodes including a root node in which to store identifiers for subsequent nodes in the path and a leaf node in which to store the unique identifier for the file; generating the leaf node that includes the identifier for the file; storing, in the data store, data representing the contents of the leaf node including the unique identifier for the file; receiving a leaf node identifier for the leaf node; performing the following operations for each of the non-leaf nodes in the path through the tree-structured index until receiving a root node identifier for the root node in the tree-structured index: generating a subsequent node in the path through the tree-structured index, the subsequent node including the node identifier for the previous node; storing, in the data store, data representing the contents of the subsequent node; and receiving a node identifier for the subsequent node; and providing the root node identifier to be used for retrieving the file with the root node identifier and the file path.

Embodiment 11 is the method of embodiment 10, wherein determining the path through the tree-structured index that defines the location in the data store at which to store the unique file identifier for the file using the file path hash comprises selecting N hash characters from the file path hash to use to determine the path through the tree-structured index that defines the location in the data store at which to store the unique file identifier for the file.

Embodiment 12 is the method of embodiment 11, wherein selecting the N hash characters from the file path hash comprises selecting N leftmost characters from the file path hash.

Embodiment 13 is the method of any one of embodiments 10 through 12, wherein generating the file path hash of the file path that identifies the unique location in the file system for the snapshot at which the particular file is stored comprises generating the file path hash of the file path using a predetermined numeral system with a particular radix; and generating the subsequent node in the path through the tree-structured index, the subsequent node including the identifier for the previous node comprises generating the subsequent node that includes at most a quantity of node identifiers defined by the particular radix.

Embodiment 14 is the method of any one of embodiments 10 through 13, comprising: receiving the unique file identifier for the file.

Embodiment 15 is the method of embodiment 14, wherein receiving the unique file identifier for the file comprises receiving a unique identifier for the file that is generated using a content hash of the content included in the file.

Embodiment 16 is the method of any one of embodiments 1 through 15, wherein using the unique identifier for the file in response to the request comprises: retrieving, from the data store, the file; and providing the file in response to the request.

Embodiment 17 is the method of any one of embodiments 1 through 16, wherein maintaining, in the data store, the tree-structured index of files in the project snapshot, the project snapshot comprising the plurality of files and directories of the file system comprises maintaining, in the data store, the tree-structured index of files in a source code project snapshot, the source code project snapshot comprising the plurality of files and directories of the file system of a code base.

Embodiment 18 is a system comprising: one or more computers and one or more storage devices storing instructions that are operable, when executed by the one or more computers, to cause the one or more computers to perform operations of any of embodiments 1 through 17.

Embodiment 19 is a computer storage medium encoded with a computer program, the program comprising instructions that are operable, when executed by data processing apparatus, to cause the data processing apparatus to perform operations of any of embodiments 1 through 17.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    maintaining, in a content-addressable data store, a tree-structured index that maps file paths of files in a directory structure to unique file identifiers of files in the content-addressable data store, wherein each node in the tree-structured index is a file in the content-addressable data store, wherein each file of a project snapshot has a respective unique file path in the directory structure of a file system separate from the content-addressable data store and the tree-structured index includes an identifier for each of a plurality of files in the project snapshot, wherein each content-addressable file is stored in the content-addressable data store at a location identified by a unique file identifier that is generated based on contents of the file,
        wherein the tree-structured index comprises a root node representing a root level of the tree-structured index, a plurality of parent nodes representing N−1 intermediate levels of the tree-structured index, and a plurality of leaf nodes representing a leaf level of the tree-structured index,
        wherein each non-leaf node stores a plurality of unique file identifiers of nodes descendant from the non-leaf node in the tree-structured index, the plurality of unique file identifiers being stored at corresponding offsets within the non-leaf node,
        wherein each leaf node stores an entry for each file of one or more files of the project snapshot, wherein each entry for each file comprises a unique file identifier for retrieving the file from the content-addressable data store, and a file path hash comprising N hash characters of a hash of the file path of the file, and
        wherein each leaf node stores respective entries for files having different file paths and N identical characters in respective file path hashes for the files;
    receiving a request to retrieve a unique file identifier corresponding to a file path of a particular file in the directory structure of the file system separate from the content-addressable data store;
    generating a file path hash of the file path;
    obtaining at least N hash characters from the file path hash of the file path;
    obtaining, for the project snapshot, a unique file identifier for the root node of the tree-structured index;
    retrieving, from the content-addressable data store, the root node for the tree-structured index using the unique file identifier for the root node;
    setting the root node as a current node;
    performing the following operations, beginning with the root node in the tree-structured index, until retrieving a leaf node in the tree-structured index:
        obtaining, from the N hash characters of the file path hash, a next hash character of the file path hash,
        using the obtained next hash character of the file path hash as an offset into the current node to obtain a unique file identifier of a subsequent node at a subsequent level of the tree-structured index,
        retrieving, from the content-addressable data store, the subsequent node using the unique file identifier, and setting the subsequent node as the current node;
    identifying, in the leaf node, an entry corresponding to the file path;
    obtaining, from the entry, a unique file identifier for the particular file in the content-addressable data store; and
    providing the unique file identifier for the particular file in response to the request.

2. The method of claim 1, wherein obtaining the at least N hash characters from the file path hash of the file path comprises obtaining N leftmost hash characters from the file path hash of the file path.

3. The method of claim 1, wherein:
    maintaining, in the content-addressable data store, the tree-structured index that maps file paths of files in the directory structure to unique file identifiers of files in the content-addressable data store comprises maintaining, in the content-addressable data store, the tree-structured index that maps file paths of files in the directory structure to unique file identifiers of files in the content-addressable data store, wherein each non-leaf node stores a list of a predetermined number of identifiers of nodes descendant from the non-leaf node in the tree-structured index;
    obtaining the at least N hash characters from the hash of the file path comprises obtaining the at least N hash characters each of which are for a numeral system with a radix comprising the predetermined number; and
    using the obtained next hash character of the file path hash as an offset into the current node to obtain the unique file identifier of the subsequent node at the subsequent level of the tree-structured index comprises using the obtained next hash character of the file path hash as an offset into the list of the predetermined number of identifiers stored in the current node to obtain the unique file identifier of the subsequent node at the subsequent level of the tree-structured index.

4. The method of claim 1, wherein each entry in a leaf node comprises the hash of the file path of the file for the file system separate from the content-addressable data store, the file path of the file for the file system separate from the content-addressable data store, and a unique file identifier for the file.

5. The method of claim 1, wherein each entry in a leaf node comprises only the hash of the file path of the file for the file system separate from the content-addressable data store, and a unique file identifier for the file.

6. The method of claim 1, wherein receiving the request to retrieve the unique file identifier corresponding to a file path of the particular file comprises receiving the request that identifies i) the unique file identifier for the root node of the tree-structured index for the project snapshot and ii) the file path of the particular file.

7. The method of claim 1, comprising:
generating, for a file from the files of the project snapshot, a file path hash of a file path that identifies a unique location of the file in the file system separate from the content-addressable data store;
determining a path through the tree-structured index that identifies a leaf node in the tree-structured index at which to store a unique file identifier for the file using the file path hash, the path identifying one or more non-leaf nodes including the root node in which to store identifiers for subsequent nodes in the path and a leaf node in which to store the unique file identifier for the file;
generating the leaf node that includes the unique file identifier for the file;
storing, in the content-addressable data store, data representing the contents of the leaf node including the unique file identifier for the file;
receiving a leaf node identifier for the leaf node;
performing the following operations for each of the non-leaf nodes in the path through the tree-structured index until receiving a root node identifier for the root node in the tree-structured index:
generating a subsequent node in the path through the tree-structured index, the subsequent node including a node identifier for the previous node;
storing, in the content-addressable data store, data representing the contents of the subsequent node; and
receiving a node identifier for the subsequent node; and
providing the root node identifier to be used for retrieving the file with the root node identifier and the file path.

8. The method of claim 7, wherein determining the path through the tree-structured index that identifies a leaf node in the tree-structured index at which to store the unique file identifier for the file using the file path hash comprises selecting N hash characters from the file path hash to use to determine the path through the tree-structured index that identifies a leaf node in the tree-structured index at which to store the unique file identifier for the file.

9. The method of claim 8, wherein selecting the N hash characters from the file path hash comprises selecting N leftmost characters from the file path hash.

10. The method of claim 7, wherein:
generating the file path hash of the file path that identifies the unique location of the file in the file system separate from the content-addressable data store comprises generating the file path hash of the file path using a predetermined numeral system with a particular radix; and
generating the subsequent node in the path through the tree-structured index, the subsequent node including the identifier for the previous node comprises generating the subsequent node that includes at most a quantity of node identifiers defined by the particular radix.

11. The method of claim 7, comprising receiving the unique file identifier for the file, wherein generating the leaf node that includes the unique file identifier for the file comprising generating the leaf node that includes the received unique file identifier for the file.

12. The method of claim 11, wherein receiving the unique file identifier for the file comprises receiving a unique identifier for the file that is generated using a content hash of the content included in the file.

13. The method of claim 1, wherein:
receiving a request to retrieve a unique file identifier corresponding to a file path of a particular file in the directory structure of the file system separate from the content-addressable data store comprises receiving a request for the particular file; and
providing the unique file identifier for the particular file in response to the request comprises:
retrieving, from the content-addressable data store, the particular file using the unique file identifier; and
providing the particular file in response to the request.

14. The method of claim 1, wherein maintaining, in the content-addressable data store, the tree-structured index that maps file paths of files in the directory structure to unique file identifiers of files in the content-addressable data store comprises maintaining, in the content-addressable data store, the tree-structured index that maps file paths of files for a source code project snapshot in the directory structure to unique file identifiers of files in the content-addressable data store, the source code project snapshot comprising a plurality of files and directories of the file system of a code base separate from the content-addressable data store.

15. The method of claim 7, comprising:
determining a number of files in the project snapshot; and
determining a predetermined number using the number of files in the project snapshot, wherein:
maintaining, in the content-addressable data store, the tree-structured index that maps file paths of files in the directory structure to unique file identifiers of files in the content-addressable data store comprises maintaining, in the content-addressable data store, the tree-structured index that maps file paths of files in a directory structure to unique file identifiers of files in the content-addressable data store, wherein each non-leaf node stores a list of the predetermined number of unique file identifiers of nodes descendant from the non-leaf node in the tree-structured index;
obtaining the at least N hash characters from the hash of the file path comprises obtaining the at least N hash characters each of which are for a numeral system with a radix comprising the predetermined number; and
using the obtained next hash character of the file path hash as an offset into the current node to obtain the unique file identifier of the subsequent node at the subsequent level of the tree-structured index comprises using the obtained next hash character of the file path hash as an offset into the list of the predetermined number of identifiers stored in the current node to obtain the unique file identifier of the subsequent node at the subsequent level of the tree-structured index.

16. The method of claim 7, comprising:
determining a number of files in the project snapshot; and
determining a predetermined number using the number of files in the project snapshot, wherein:
maintaining, in the content-addressable data store, the tree-structured index that maps file paths of files in the directory structure to unique file identifiers of files in the content-addressable data store comprises maintaining, in the content-addressable data store, the tree-structured index that maps file paths of files in a directory structure to unique file identifiers of files in the content-addressable data store, wherein each non-leaf node stores a list of the predetermined number of unique file identifiers of nodes descendant from the non-leaf node in the tree-structured index; and generating the subsequent node in the path through the tree-structured index, the subsequent node including the node identifier for the previous node comprises generating the subsequent node in the path through the tree-structured index that includes at most the predetermined number of node identifiers.

17. A system comprising one or more computers and one or more storage devices storing instructions that are operable, when executed by the one or more computers, to cause the one or more computers to perform operations comprising:

maintaining, in a content-addressable data store, a tree-structured index that maps file paths of files in a directory structure to unique file identifiers of files in the content-addressable data store, wherein each node in the tree-structured index is a file in the content-addressable data store, wherein each file of a project snapshot has a respective unique file path in the directory structure of a file system separate from the content-addressable data store and the tree-structured index includes an identifier for each of a plurality of files in the project snapshot, and wherein each content-addressable file is stored in the content-addressable data store at a location identified by a unique file identifier that is generated based on contents of the file, wherein the tree-structured index comprises a root node representing a root level of the tree-structured index, a plurality of parent nodes representing N−1 intermediate levels of the tree-structured index, and a plurality of leaf nodes representing a leaf level of the tree-structured index, wherein each non-leaf node stores a plurality of unique file identifiers of nodes descendant from the non-leaf node in the tree-structured index, the plurality of unique file identifiers being stored at corresponding offsets within the non-leaf node, wherein each leaf node stores an entry for each file of one or more files of the project snapshot, wherein each entry for each file comprises a unique file identifier for retrieving the file from the content-addressable data store, and a file path hash comprising N hash characters of a hash of the file path of the file, and wherein each leaf node stores respective entries for files having different file paths and N identical characters in respective file path hashes for the files;

receiving request to retrieve a unique file identifier corresponding to a file path of a particular file in the directory structure of the file system separate from the content-addressable data store;

generating a file path hash of the file path;

obtaining at least N hash characters from the file path hash of the file path;

retrieving, from the content-addressable data store, the root node for the tree-structured index using the unique file identifier for the root node;

setting the root node as a current node;

performing the following operations, beginning with the root node in the tree-structured index, until retrieving a leaf node in the tree-structured index:

obtaining, from the N hash characters of the file path hash, a next hash character of the file path hash, using the obtained next hash character of the file path hash as an offset into the current node to obtain a unique file identifier of a subsequent node at a subsequent level of the tree-structured index, retrieving, from the content-addressable data store, the subsequent node using the unique file identifier, and setting the subsequent node as the current node;

identifying, in the leaf node, an entry corresponding to the file path;

obtaining, from the entry, a unique file identifier for the particular file in the content-addressable data store; and providing the unique file identifier for the particular file in response to the request.

18. The system of claim 17, wherein obtaining the at least N hash characters from the file path hash of the file path comprises obtaining N leftmost hash characters from the file path hash of the file path.

19. The system of claim 17, wherein:

maintaining, in the content-addressable data store, the tree-structured index that maps file paths of files in the directory structure to unique file identifiers of files in the content-addressable data store comprises maintaining, in the content-addressable data store, the tree-structured index that maps file paths of files in the directory structure to unique file identifiers of files in the content-addressable data store, wherein each non-leaf node stores a list of a predetermined number of identifiers of nodes descendant from the non-leaf node in the tree-structured index;

obtaining the at least N hash characters from the hash of the file path comprises obtaining the at least N hash characters each of which are for a numeral system with a radix comprising the predetermined number; and using the obtained next hash character of the file path hash as an offset into the current node to obtain the unique file identifier of the subsequent node at the subsequent level of the tree-structured index comprises using the obtained next hash character of the file path hash as an offset into the list of the predetermined number of identifiers stored in the current node to obtain the unique identifier of the subsequent node at the subsequent level of the tree-structured index.

20. The system of claim 17, wherein each entry in a leaf node comprises the hash of the file path of the file for the file system separate from the content-addressable data store, the file path of the file for the file system separate from the content-addressable data store, and a unique file identifier for the file.

21. The system of claim 17, wherein each entry in a leaf node comprises only the hash of the file path of the file for the file system separate from the content-addressable data store, and a unique file identifier for the file.

22. The system of claim 17, wherein receiving the request to retrieve the unique file identifier corresponding to the file path of the particular file comprises receiving the request that identifies i) the unique file identifier for the root node of the tree-structured index for the project snapshot and ii) the file path of the particular file.

23. The system of claim 17, the operations comprising:

generating, for a file from the files of the project snapshot, a file path hash of a file path that identifies a unique location of the file in the file system separate from the content-addressable data store;

determining a path through the tree-structured index that identifies a leaf node in the tree-structured index at which to store a unique file identifier for the file using the file path hash, the path identifying one or more non-leaf nodes including the root node in which to store identifiers for subsequent nodes in the path and a leaf node in which to store the unique file identifier for the file;

generating the leaf node that includes the unique file identifier for the file;

storing, in the content-addressable data store, data representing the contents of the leaf node including the unique file identifier for the file;

receiving a leaf node identifier for the leaf node;

performing the following operations for each of the non-leaf nodes in the path through the tree-structured index until receiving a root node identifier for the root node in the tree-structured index:

generating a subsequent node in the path through the tree-structured index, the subsequent node including a node identifier for the previous node;

storing, in the content-addressable data store, data representing the contents of the subsequent node; and receiving a node identifier for the subsequent node; and providing the root node identifier to be used for retrieving the file with the root node identifier and the file path.

24. The system of claim 23, wherein determining the path through the tree-structured index that identifies a leaf node in the tree-structured index at which to store the unique file identifier for the file using the file path hash comprises selecting N hash characters from the file path hash to use to determine the path through the tree-structured index that identifies a leaf node in the tree-structured index at which to store the unique file identifier for the file.

25. The system of claim 24, wherein selecting the N hash characters from the file path hash comprises selecting N leftmost characters from the file path hash.

26. A non-transitory computer storage medium encoded with instructions that, when executed by one or more computers, cause the one or more computers to perform operations comprising:

maintaining, in a content-addressable data store, a tree-structured index that maps file paths of files in a directory structure to unique file identifiers of files in the content-addressable data store, wherein each node in the tree-structured index is a file in the content-addressable data store, wherein each file of a project snapshot has a respective unique file path in the directory structure of a file system separate from the content-addressable data store and the tree-structured index includes an identifier for each of a plurality of files in the project snapshot, and wherein each content-addressable file is stored in the content-addressable data store at a location identified by a unique file identifier that is generated based on contents of the file, wherein the tree-structured index comprises a root node representing a root level of the tree-structured index, a plurality of parent nodes representing N−1 intermediate levels of the tree-structured index, and a plurality of leaf nodes representing a leaf level of the tree-structured index, wherein each non-leaf node stores a plurality of unique file identifiers of nodes descendant from the non-leaf node in the tree-structured index, the plurality of unique file identifiers being stored at corresponding offsets within the non-leaf node, wherein each leaf node stores an entry for each file of one or more files of the project snapshot, wherein each entry for each file comprises a unique file identifier for retrieving the file from the content-addressable data store, and a file path hash comprising N hash characters of a hash of the file path of the file, and wherein each leaf node stores respective entries for files having different file paths and N identical characters in respective file path hashes for the files;

receiving a request to retrieve a unique file identifier corresponding to a file path of a particular file in the directory structure of the file system separate from the content-addressable data store;

generating a file path hash of the file path;

obtaining at least N hash characters from the file path hash of the file path;

obtaining, for the project snapshot, a unique file identifier for the root node of the tree-structured index;

retrieving, from the content-addressable data store, the root node for the tree-structured index using the unique file identifier for the root node;

setting the root node as a current node;

performing the following operations, beginning with the root node in the tree-structured index, until retrieving a leaf node in the tree-structured index:

obtaining, from the N hash characters of the file path hash, a next hash character of the file path hash, using the obtained next hash character of the file path hash as an offset into the current node to obtain a unique file identifier of a subsequent node at a subsequent level of the tree-structured index, retrieving, from the content-addressable data store, the subsequent node using the unique file identifier, and setting the subsequent node as the current node;

identifying, in the leaf node, an entry corresponding to the file path;

obtaining, from the entry, a unique file identifier for the particular file in the content-addressable data store; and providing the unique file identifier for the particular file in response to the request.

* * * * *